United States Patent

Clifford

[15] 3,649,815

[45] Mar. 14, 1972

[54] LOOK-AHEAD CARRY FOR COUNTERS

[72] Inventor: Colin Clifford, Glenrothes, Fife, Scotland

[73] Assignee: General Instrument Microelectronics Ltd., Fife, Scotland

[22] Filed: Sept. 4, 1969

[21] Appl. No.: 855,093

[52] U.S. Cl. ....................235/92 LG, 235/92 R, 235/92 EV, 235/92 GT

[51] Int. Cl. .........................................................H03k 21/16

[58] Field of Search .......................235/92 EV, 92 GT, 92 LG

[56] References Cited

UNITED STATES PATENTS

| | | | |
|---|---|---|---|
| 3,114,883 | 12/1903 | Arthur | 235/92 EV |
| 3,443,071 | 5/1969 | Petzold | 235/92 EV |
| 2,845,617 | 7/1958 | Turvey | 235/92 PE |

*Primary Examiner*—Maynard R. Wilbur
*Assistant Examiner*—Robert E. Gnuse
*Attorney*—James and Franklin

[57] ABSTRACT

A circuit for use with a counter senses and stores a precarry condition in the counter when one count away from a carry condition so that the next count signal is directly propagated through the circuit to produce a carry output signal substantially simultaneously with that count signal. The precarry circuit is electrically isolated from the counter during the time of the count signal so that a change in the counter direction control may be made at that time without causing the production of a spurious carry signal.

8 Claims, 4 Drawing Figures

INVENTOR
COLIN CLIFFORD
BY Jones and Franklin
ATTORNEY

INVENTOR

BY [signature]
ATTORNEY

INVENTOR

BY James and Franklin

ATTORNEY

LOOK-AHEAD CARRY FOR COUNTERS

The present invention relates generally to counters, and particularly to a circuit for producing a carry output signal for use in counters.

Binary counters are commonly used in control and arithmetic portions of digital computer systems and the like to provide a numerical indication corresponding to the number of times, count pulses applied to the counter input. In one application of a counter a pulse train of a precisely known repetition rate is initiated and terminated upon the occurrence of two control events. The number of pulses "counted" in the counter during the interval between these events provides an accurate indication of the time duration of that interval.

Binary counters typically comprise a plurality of binary stages connected to one another in a predetermined circuit arrangement. For purposes of ease of readout and interpretation, the stages in the majority of counters are interconnected to operate the counter as a decade or decimal counter, although numerical bases other than "10" may be used to satisfy particular system requirements.

In binary counters, a carry signal is produced when a counter stage reaches a predetermined count, that carry signal being transferred to the succeeding counter stage to operate as the next input count signal to that stage. For example, in a decade counter, once a "9" count has been established, the succeeding input pulse returns the counter to a "0" condition and transfers a carry signal to the next higher counter stage, the resulting count in both stages thus corresponding to a count of "10" as desired.

In most counters the counting stages are connected in cascade or series because there are fewer interstage connections required than are needed for connection of the stages in parallel. In a series connected counter, the count signal is applied to the input of the first stage and the carry output of that stage is connected to the input of the succeeding stage, and so on, until the carry signal appears at the final counter stage. In a counter having a total of "$n$" stages, the carry signal must be propagated through ($n-1$) stages before it appears at the final counter stage. This relatively long propagating time required to produce the carry output signal in counters of this type, renders these counters unsuitable for use in digital computers in which high-speed operation is required.

To increase the flexibility of such counters it is highly desirable that they be able to count in two directions, "up" to perform an addition operation and "down" to perform a subtraction operation. A carry output signal is produced for both operations of the counter. In a decade counter the carry signal is produced when counting up during the transition from "9" to "0," and when counting down during the transition from "0" to "9." It is common in the operation of such reversible or bidirectional counters to frequently switch from one mode of operation to the other.

Several counter circuits have been proposed to reduce the time required for propagating a carry output signal through the series connected stages of the counter. While these circuits are generally effective to reduce the carry propagating time, there are significant drawbacks and limitations in their operation which detract from their utility, particularly when they are employed in a reversible counter.

One of the more significant of these limitations is that the up and down control signals could be changed only when the input count signal is at a particular one of its two logic levels. If that change occurs when the logic level of the count signal is at the other of its logic levels, the carry output signal would be spurious and would introduce an erroneous indication in the counter. In the prior art reversible counters separate carry output lines are commonly required for each of the two counting directions of the counter, thereby increasing the complexity of these counters. Moreover, in some of these counter circuits, additional buffering and shaping circuits are required to produce a carry output signal that is capable of driving the succeeding counter stages which further adds to the complexity of the circuit and increases the cost and power dissipation thereof.

It is the prime object of the present invention to provide a circuit for use in a counter in which the time required to produce a carry output signal upon the presence of a predetermined count signal is significantly reduced.

It is also an object of the present invention to provide a circuit capable of producing a carry output signal substantially simultaneously with the occurrence of the count signal producing that carry signal.

It is a further object of the present invention to provide in a reversible counter a circuit having a single carry output line for both up and down carries.

It is another object of the present invention to provide a carry output signal producing circuit for use with a reversible counter in which a change in the up/down control line during either logic state of the count signal does not produce a spurious carry signal.

It is yet another object of the present invention to provide a circuit for producing a carry output signal in a reversible counter in which correct carry signals are reliably produced despite a great number of reversals in the counting direction.

It is still another object of the present invention to provide a circuit for producing a carry output signal in a counter, which circuit utilizes high-speed switching field effect transistors, and which thus can be fabricated on a single chip of semiconductor material.

The circuit of the present invention comprises a gate which is conditioned upon the sensing of a precarry condition in the counter. That gate, when so conditioned, directs or propagates the succeeding count signal to an output node as the carry signal, the latter signal thus being produced substantially simultaneously with the occurrence of that count signal. After the logic gate has sensed a precarry condition, it is effectively isolated from the counter stages in the period of the next count signal and thus stores the precarry signal during that period. A change in the up/down control of the counter may thus occur during either logic condition of the count signal without causing the production of an erroneous carry signal. When that change occurs during the count signal following a precarry condition a carry signal is produced, and when that change occurs in the period between the count signal establishing a precarry condition and the succeeding count signal, no carry signal is produced.

The present circuit comprises a first switching device interposed between the counter and the precarry sensing and storing gate. During the period between the count signals that switching device is conductive and connects the precarry signal (when it is present) to the control terminal of a second switching device which, together with a third switching device, defines said gate. The precarry signal is stored at the control terminal capacitance of the second switching device, the latter thus being present during that period to a condition corresponding to the precarry state of the counter. The succeeding count signal is applied to the control terminal of the third switching device. For a stored precarry condition at the second switching device, that count signal establishes a unique signal at the output of the gate, which in turn causes the production of a carry signal at the output node substantially simultaneously with that count signal. At this time (i.e., the time of the succeeding count signal) the first switching device is turned off, thereby isolating the second switching device control terminal from the counter so that any change in the counter during this time, such as a change in the direction of count (e.g., from counting "up" to counting "down") does not affect the carry output signal.

To the accomplishment of the above, and to such other objects as may hereinafter appear, the present invention relates to a carry output signal producing circuit, as defined in the appended claims and as described in the specification, taken together with the accompanying drawings, in which:

Broadly considered, the circuit of the present invention comprises a gating circuit which samples and then stores a precarry condition derived by sensing the state of a counter. That stored precarry signal conditions the gating circuit so that during the next count signal the conditioned gating circuit produces an output carry signal substantially simultaneously therewith.

After the precarry signal is stored at the gating circuit, that circuit is isolated from the counter by the operation of a switching device interposed between the gating circuit and the counter, the switching device being rendered conductive only in the interval between count signals. During each count signal, that switching device is turned off to provide the isloation between the gating circuit and the source of the precarry signal. As a result the direction of counting (i.e., "up" or "-down") may be reversed after a precarry condition is sensed during either logic condition of the count signal, without causing a spurious carry signal to be produced.

The carry signal producing circuit of the present invention is effective to produce a carry signal for counters operating at any base, but is herein specifically shown, solely for purposes of example, as operating with a decade or base "10" counter. In a decade counter, a carry signal is to be produced following a "9" count when counting "up," and following a "0" count when counting "down," so that a precarry condition is to be established in the gating circuit when the appropriate one of these counter values is sensed.

Figure 4:
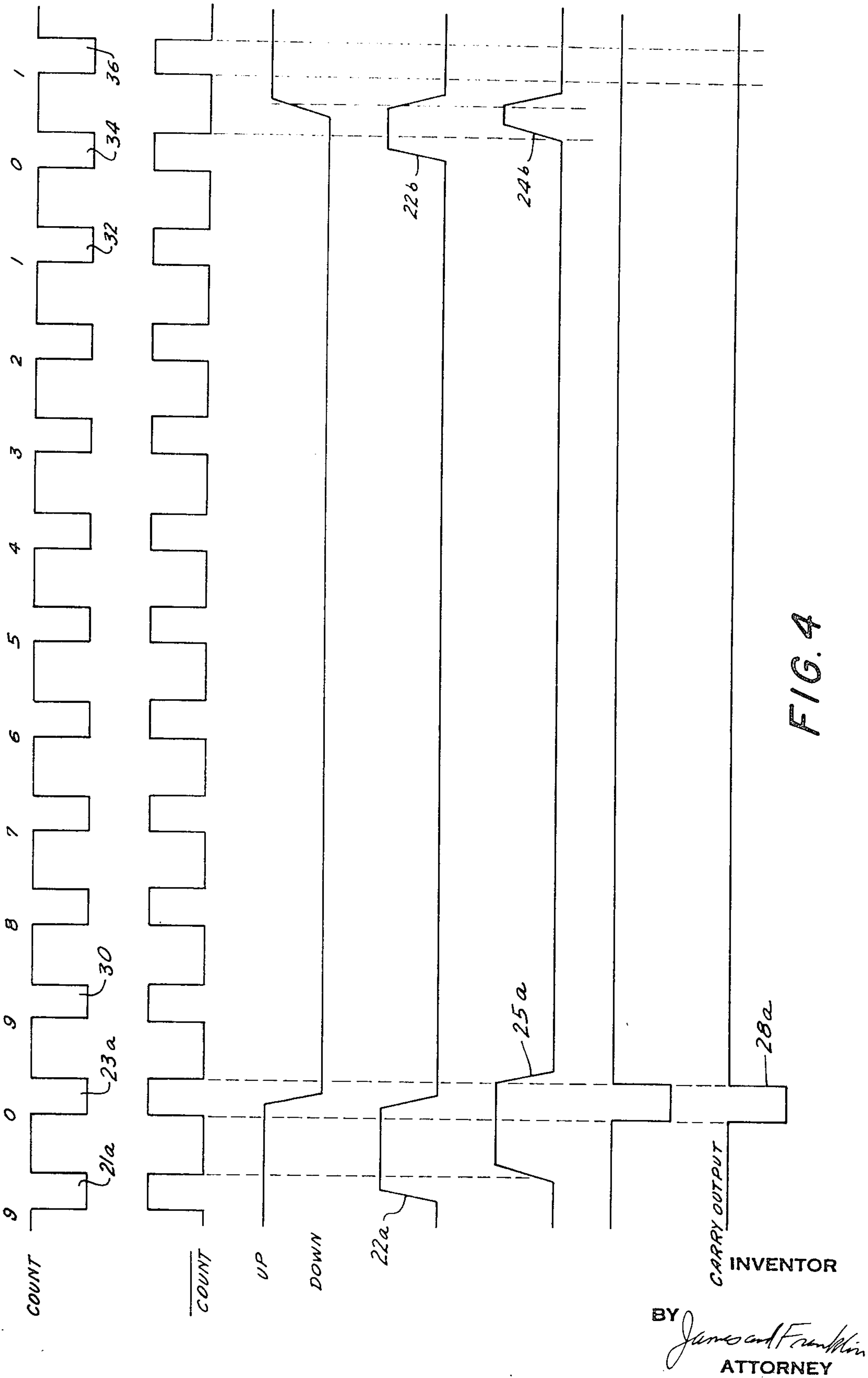
FIG. 4 is a waveform diagram similar to FIG. 3 illustrating the signals for a counting operation in which the count direction is reversed both during and before a carry condition.

That precarry signal is produced by the operation of gates G1, G2 and G3. Gates G1 and G2 decode the count in the counter stages (not shown) and also receive the up-down direction control line, which, as shown in the third line from the top in FIG. 4, is at a "0" logic level for an "up" count command and at a logic "1" level for a "down" count command. For simplicity of fabrication on an integrated circuit, gates G1, G2 and G3 are all designed to implement a NOR function. Gate G1 receives the inverse of the signals A and D from the first and last counter stage along with the up control signal, and gate G2 receives at its inputs the signals A,B,C, and D from four counter stage and the inverse of the down control signal. (The counter stages and the inverter circuits required to produce the desired inverse signals are not shown in the drawings as these circuits are well known in the art and by themselves form no part of the present invention). For each of the two possible precarry conditions, the inputs to the appropriate gate, i.e., G1 for an up count and G2 for a down count, are all at the logic "0" condition. For a precarry condition, at least one input to gates G1 and G2 is at a logic "1" condition. Thus for a precarry condition the outputs of one of the gates G1 and G2 (depending on the direction of counting) is uniquely at a logic "1" level.

Figure 2:
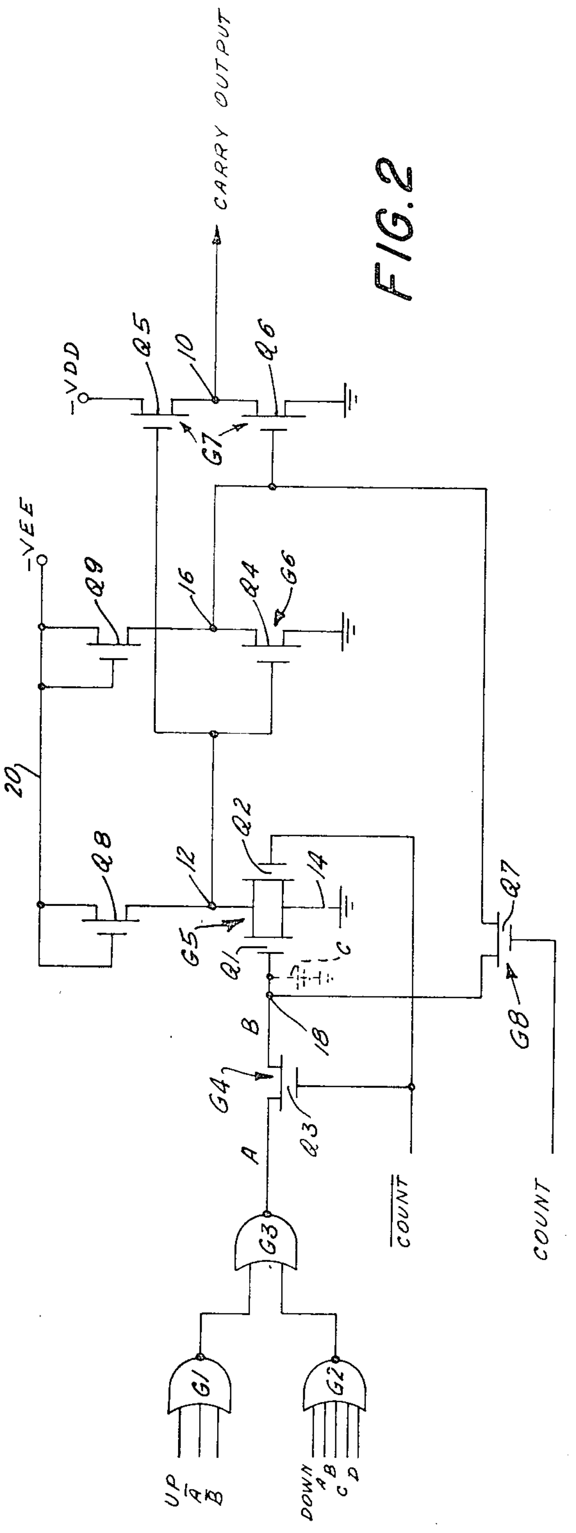
FIG. 2 is a more detailed schematic circuit diagram of the circuit.

Referring to the block diagram of FIG. 2, the outputs of gates G1 and G2 are applied as the inputs to NOR-gate G3, the output of which is applied as one of the inputs to an AND-gate G4. The other input to gate G4 is the inverse of the count signal, or the $\overline{\text{count}}$ signal. The output of gate G4 is applied as one of the inputs to a NOR-gate G5, the other input to G5 being the $\overline{\text{count}}$ signal. Gate G5 is the precarry sampling and storing gating circuit described above. To provide a carry output signal having sufficient amplitude to drive the output circuits (not shown) receiving the carry signal, and to provide buffering action between the carry signal producing circuit and those output circuits, the output of gate G5 is applied to an inverter NOR-gate G6 which provides the complementary drive signals to a push-pull output stage G7. The carry output signal is produced at the output of gate G7 at output node 10. An AND-gate G8, receiving the count signal at one of its inputs, is connected in feedback relation between the output of gate G6 and the input of gate G5.

Figure 1:
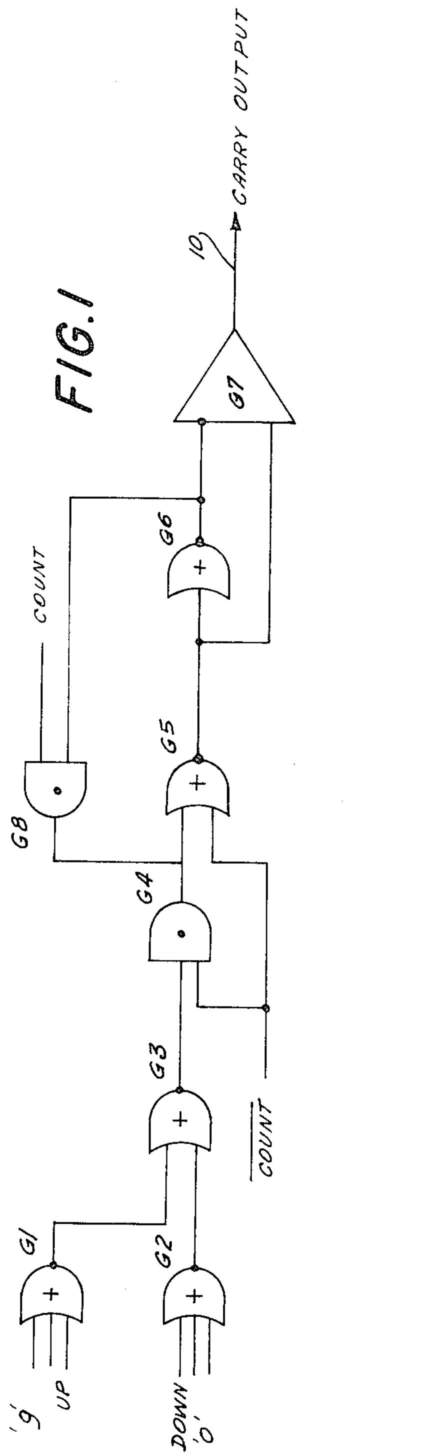
FIG. 1 is a schematic block diagram of the circuit of the present invention.

As seen in FIG. 1, gate G5 comprises field effect transistors (FET's) Q1 and Q2 whose output circuits (i.e., the circuits between their source and drain terminals) are connected in parallel between a node 12 and a reference point (here ground) at 14, conduction between the output terminals of a field effect transistor is effected only when a sufficiently negative potential is applied at the gate terminal. For an insufficiently negative gate potential the FET is turned off and an effective open circuit is defined between the output terminals. The gate of FET Q1 is connected to one terminal of the output circuit of a switching device in the form of FET Q3, the other terminal of which is connected to the output of gate G3. FET Q3 thus defines gate G4 of FIG. 1. An inherent capacitance C is defined between the gate terminal of FET Q1 and ground. The control or gate terminals of FET's Q2 and Q3 each receive the $\overline{\text{count}}$ signal.

Node 12 is connected to the gate terminal of FET Q4 defining inverter gate G6, and to the gate terminal of FET Q5 which, along with FET Q6, defines the push-pull output stage G7. The output circuit of FET Q4 is connected between a node 16 and ground, node 16 being connected to the gate terminal of FET Q6. The output circuits of FET's Q5 and Q6 are series connected between a negative voltage supply source VDD and ground. Node 16 is also connected to one output terminal of FET Q7 defining the gate G8, the other output terminal of which is connected to the input of gate G5 at the gate terminal of FET Q1 at node 18. The gate terminal of FET Q7 receives the count signal.

Node 12 is connected through the output circuit of FET Q8 to a negative voltage line 20 at a level VEE which may be of a greater negative magnitude than VDD. Node 16 is connected to line 20 through the output circuit of FET Q9. The gate terminals of FET's Q8 and Q9 are each connected to line 20 so that these FET's are conductive at all times. The choice of the magnitudes of voltage levels VDD and VEE is made to best match the characteristics of the FET's in the circuit, and to best satisfy the speed, power and other requirements of the circuit.

OPERATION

Gates G1 and G2 constantly monitor and decode the state of the counter stages. For conditions other than a precarry condition in the counter stages, the outputs of gates G1 and G2 are both at the logic "0" or ground level, and the output of Nor-gate G3 is correspondingly at a logic "1" or negative level. For a precarry condition to exist during an "up" count, i.e., a count of "9," gate G1 decodes that condition by applying a logic "1" or negative input to the input of gate G3; and for a precarry condition to exist during a "down" count, gate G2 produces a logic "1" or negative signal at its output which is applied to the input of gate G3. Thus for a precarry condition for either an "up" or "down" counting operation the output of gate G3 is a logic "0" or substantially ground signal. At all other times, that output is a logic "1" or negative signal.

During each $\overline{\text{count}}$ period i.e., the interval between the count signals, the output circuit of FET Q3 is conductive and the output signal of gate G3 is connected to the gate terminal of FET Q1 and establishes a potential level on capacitor C with respect to ground corresponding to the signal level at the output of gate G3. During the next count signal, the $\overline{\text{count}}$ signal goes to ground and FET Q3 is then turned off. However, capacitor C stores the signal level applied to it in the previous $\overline{\text{count}}$ period, and that signal thus controls the conductivity of FET Q1 in the period of the next count signal.

For a nonprecarry condition that signal is a negative signal, FET Q1 is rendered conductive, and node 12 is connected to ground through the conducting output circuit of FET Q1. (During the $\overline{\text{count}}$ period FET Q2 is also conductive and provides a second conducting path between node 12 and ground).

The ground signal at node 12 is applied to the gate terminal of FET Q4 to render the latter nonconductive so that node 16 is charged to a negative level through the output circuit of FET Q9. The negative signal at node 16 is reflected at the gate terminal of FET Q6 to render its output circuit conductive, thereby to connect output node 10 to ground. The ground signal at node 12 applied to the gate terminal of FET Q5 also renders that FET nonconductive.

Figure 3:
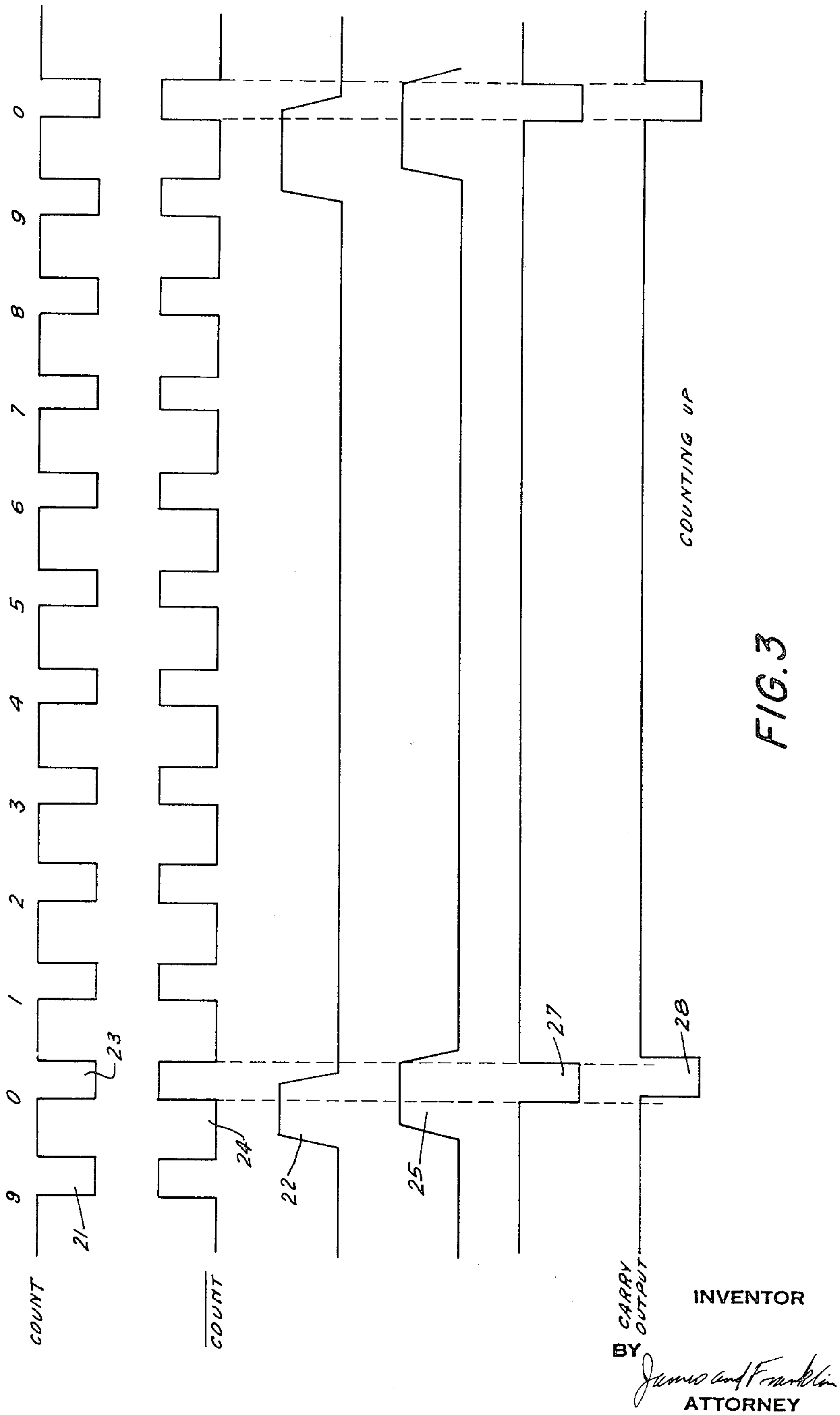
FIG. 3 is a waveform diagram of the relevant signals for a counting up operation.

For a precarry condition (for which the pertinent waveforms are illustrated in FIG. 3 for an "up" counting operation), the output of gate G3 goes to ground shortly after the "9" count signal 21 is counted. (A similar precarry signal is produced for a "down" count following the decoding of a "0" count). The output signal of gates G3, shown at 22 in the third line from the top of FIG. 3, is the precarry signal for an "up" count. During the interval between the "9" count signal 21 and the succeeding or "0" count signal 23, FET Q3 is turned on by the then negative $\overline{\text{count}}$ signal 24, and transfers the precarry signal 22 to the gate terminal of FET Q1 to develop the stored precarry signal 25 shown in the fourth line of FIG. 3. Since, as described above, FET Q3 is turned off during the succeeding or "0" count signal 23, the charge on capacitor C remains at ground for the period of count signal 23 (FET Q3 remains off), and as a result, FET Q1 is turned off. As FET Q2 is also turned off at this time (the $\overline{\text{count}}$ signal at its gate is at ground) there is no longer a conducting path between node 12 and ground, so that node 12 is now charged negative through the output circuit of FET Q8 to develop the negative signal 27 shown at the fifth line of FIG. 3.

That negative signal renders FET's Q4 and Q5 conductive. The conductivity of FET Q4 connects node 16 to ground and FET Q6 is turned off. The conductivity of FET Q5 connects output node 10 to the negative VDD supply to produce the carry output signal 28 at output node 10 (shown in the bottom line of FIG. 3) substantially simultaneously with the "0" count signal 23 as desired.

Thus it is seen that the signal at node 10 is determined by the stored charge on the gate capacitor C of FET Q1, which is in turn determined by the presence or absence of a precarry condition in the counter. For a precarry condition that stored charge is substantially at ground so that during the next count signal (here 23) FET Q1 is nonconductive.

To avoid the charge on capacitor C from leaking off to an incorrect level for counter applications in which the count signal duration is relatively long, node 16 is connected to node 18 during each count signal through the conducting output circuit of FET Q7. As the signal at node 16 is at the same logic level as the desired level at node 18, the effective feeding back of that signal to capacitance C ensures that the signal at that capacitance is always at its proper level.

It can thus be readily appreciated that once a precarry condition is decoded, as characterized by a precarry signal output from gate G3, the up/down direction control signal may be changed at any time thereafter in either logic state of the count signal without producing a spurious carry signal. If that change occurs when the $\overline{\text{count}}$ signal is at logic "1" level, i.e., in the interval between count signals, there will be a corresponding change in the output of gates G1 or G2 depending on the direction of count, so that the output gate G3 returns to a logic "1" or nonprecarry level. That change in the precarry signal is sensed and stored during this interval at the gate capacitance C of FET Q1 so that upon the next count signal, no carry signal is produced at output node 10. The only requirement for this operation is that the signal output of gate G3 be stable for a sufficient period prior to the next count signal (i.e., when the $\overline{\text{count}}$ signal goes to a logic "0" condition).

On the other hand if the counting direction is changed during the next count signal, i.e., when the $\overline{\text{count}}$ signal is at a logic "0" condition, FET Q3 is cut off so that the stored precarry signal on the gate capacitance C of FET Q1 is unaffected by the resulting change in the output of gate G3 and remains at the level established thereat during the previous interval between the count signals, prior to the change in the count direction. For this operation if a precarry condition is established and stored at the gate terminal of FET Q1, it will remain at that condition irrespective of the change in the direction of count, and the carry signal will be produced substantially simultaneously with the next count signal.

This is illustrated in the waveform diagram of FIG. 4 which is similar to FIG. 3 with the exception that in addition to the signals shown in FIG. 3, the up/down control signal is shown in the third line from the top of FIG. 4. In the counter operation illustrated in FIG. 4, the counter is initially counting in the up direction so that as the "9" count is detected, a precarry signal **22*a*** is produced at the output of gate G3.

In the interval between the "9" count signal **21*a* and the next or "0" signal 23*a*, the precarry signal is transferred through the output circuit of FET Q3 to establish the stored precarry signal 25*a* on the gate capacitance of FET Q1. As shown, the direction control signal is changed to a down signal during the "0" counting signal 23*a*, but since FET Q3 is cut off at that time this change has no effect upon the stored precarry signal 25*a*. As a result, a carry signal 28*a* is produced at output node 10** in the manner described above.

The counter, now counting in the down direction, then proceeds to count the succeeding count signals. In the period between the next "9" count signal 30 and the "1" count signal 32, no precarry signal is produced at the output of gate G3, so that the gate terminal of FET Q1 remains at its negative or nonprecarry level. Upon the occurrence of the next "0" count signal 34 a second precarry signal **22*b* is produced at the output of gate G3 and is transferred and stored on the gate capacitance C of FET Q1 during the following interval between the "0" count signal 34 and the next "1" count signal 36. During this interval, however, the count direction is reversed (from down to up) and as a result the precarry signal 22*b* is no longer produced at the output of gate G3. Since FET Q3 is still conductive at this time, this change in the precarry signal 22*b* is reflected in a corresponding change in the stored precarry signal 24*b* at the gate capacitance C of FET Q1. At the time of the next count signal 36 the signal 24*b*** at the gate capacitance C of FET Q1 has been returned to its negative, nonprecarry level so that, as shown in the bottom line of FIG. 4, no carry signal is produced as is desired.

The circuit of the present invention thus has the capability of producing a carry signal substantially simultaneously with the presence of the count signal that is to produce a carry for the counter. This provides for high-speed propagation of the carry signal through the stages of a serial counter. As an added feature the circuit is used to particular advantage in an up/down or reversible counter, because a change in the direction of count (after a precarry condition is sensed) can be made with the counting signal input in either of its logic states without causing the production of a spurious carry signal. As a result the accuracy and flexibility of such counters is significantly increased.

Greater flexibility of circuit operation is also achieved by the use of a single line to provide both the up and down control signals, as well as by the provision of a single carry output line for both directions of counting.

The use of field effect transistors in the circuit of this invention provides for circuit operation at increased speeds and reduced power dissipation. Moreover, the amenability of such transistors to large scale integrated circuit techniques makes them highly suitable for fabrication, along with the counter circuitry, on a single miniature chip of semiconductor material.

While only a single embodiment of the present invention has been herein specifically disclosed, it will be apparent that many variations may be made thereto without departing from the spirit and scope of the invention.

I claim:

1. A circuit for producing a carry signal for a counter upon the presence of a predetermined one of a series of timed count signals, said circuit comprising first logic means having an input operatively connected to said counter effective to produce a precarry signal upon the presence of a predetermined condition of said counter, second logic means receiving a count signal, and switch means actuated in the absence of a count signal and deactuated in the presence of a count signal, operatively interposed between said first and second logic means, and effective when actuated to operatively connect said second logic means to said first logic means, thereby to establish a precarry condition at the former in response to said precarry signal when present and when deactuated, to electrically isolate said second logic means from said first logic means, said second logic means being effective when once established in a precarry condition and upon the application thereto of said predetermined count signal, to produce a carry signal substantially simultaneously with said predetermined count signal, in which said second logic means comprises gating means having an input operatively connected to said switch means and an output node, and means effective to charge said output node to a first operative level in the absence of a precarry condition at said second logic means, and in which said gating means comprises second and third switch means having their outputs operatively connected between said output node and a reference point at said first operative level, the control terminal of said second switch means defining said input, the control terminal of said third switch means receiving the complement of a count signal and effective when actuated thereby to operatively connect said output node to said reference point.

2. The circuit of claim 1, in which said first logic means comprises second and third gating means, said first gating means being effective to produce a precarry signal when the counter is counting in the up direction, said second gating means being affective to produce a precarry signal when the counter is counting in the down direction.

3. The circuit of claim 1, comprising a source of a second operative level operatively connected to said output node, said second switch means being turned off when said precarry condition is established at said input and effective when so turned off to charge said output node to said second operative level during the succeeding count signal which is effective to render said third switch means effective to operatively disconnect said output node from said reference point.

4. The circuit of claim 3, in which said first logic means comprises second and third gating means, said first gating means being effective to produce a precarry signal when the counter is counting in the up direction, said second gating means being effective to produce a precarry signal when the counter is counting in the down direction.

5. The circuit of claim 3, in which said second logic means further comprises a second output node, fourth switch means having a control terminal operatively connected to said first-mentioned output node, an output circuit operatively connected to said second output node, and fifth switch means actuated by a count signal and effective when so actuated to operatively connect said second output node to said input.

6. The circuit of claim 5, in which said first logic means comprises second and third gating means, said first gating means being effective to produce a precarry signal when the counter is counting in the up direction, said second gating means being effective to produce a precarry signal when the counter is counting in the down direction.

7. The circuit of claim 1, in which said second logic means further comprises a second output node, fourth switch means having a control terminal operatively connected to said first-mentioned output node, an output circuit operatively connected to said second output node, and fifth switch means actuated by a count signal and effective when so actuated to operatively connect said second output node to said input.

8. The circuit of claim 7, in which said first logic means comprises second and third gating means, said first gating means being effective to produce a precarry signal when the counter is counting in the up direction, said second gating means being effective to produce a precarry signal when the counter is counting in the down direction.

* * * * *